Dec. 29, 1931.    E. F. ROSS    1,838,574

THREADLESS HOSE COUPLING

Filed Jan. 14, 1928

INVENTOR.
Elton F. Ross
BY
ATTORNEY.

Patented Dec. 29, 1931

1,838,574

UNITED STATES PATENT OFFICE

ELTON F. ROSS, OF OLYMPIA, WASHINGTON

THREADLESS HOSE COUPLING

Application filed January 14, 1928. Serial No. 246,826.

The object of my invention is to provide a threadless hose coupling which is designed, primarily, for a quick and effective method of coupling and uncoupling of hose, also permitting lengthwise pulling or dragging of many lengths of coupled or uncoupled hose, through grass, brush, timber débris, etc., without the coupling catching, snagging, or in any way interfering with the free, lengthwise movement of the hose, over rough or obstructive areas.

At present, as far as I know, hose couplings in use are characterized by having their point of contact, or sealing face, at right angles with their channel, which objectionable feature permits the coupling to spread apart at the seal from lengthwise pulling strain, internal pressure, wear, or jar, and requires threads, gaskets or locking device to hold the contact surface together to insure positive seal under working conditions.

My improved hose coupling is characterized by having no threads, gaskets, or locking devices to insure a positive seal. The seal in my improved coupling becomes tighter as internal pressure increases, as well as tightening in proportion to lengthwise strain, jar, etc., and another feature of my seal is that it will compensate for wear, being joined by a sliding contact face, which wedges tighter as the tension increases.

My invention, broadly speaking, consists or comprises two members each having a longitudinal bore, and a contacting face disposed in an angle oblique to the bore and extending without interruption from side wall to side wall of the member, and means integral with and within the perimeter of each member and within the joint between the members constructed to engage and interlock to retain members in interlocked coupled position.

Figure 1:
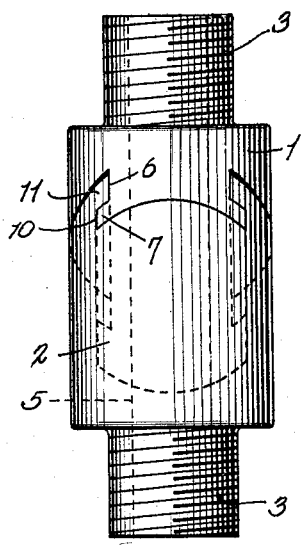
Figure 1 is a front elevation of my improved coupling.
Figure 2:
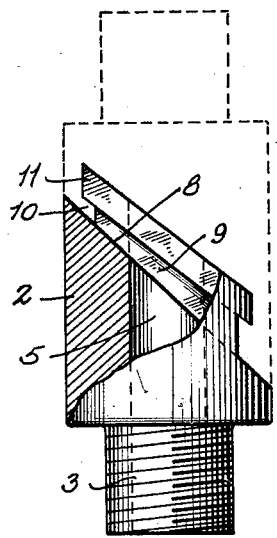
Figure 2 is a view illustrating the two sections of my coupling in position ready to be assembled, one of the couplings being shown partly in section.
Figure 3:
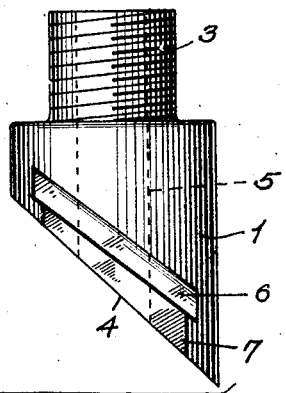
Figure 3 is a longitudinal sectional view of the couplings assembled.
Figure 4:
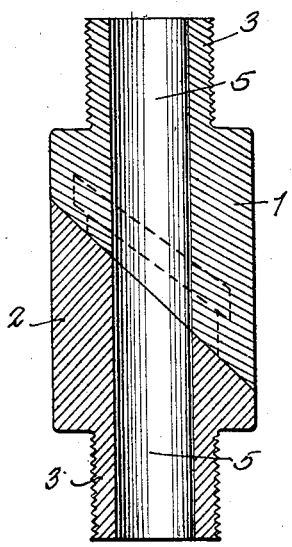
Figure 4 is a perspective view of the female coupling.
Figure 5:
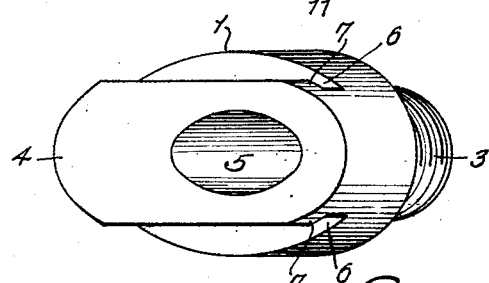
Figure 5 is a perspective view of the male coupling.

My improved hose coupling comprises two members, 1 and 2, each having extension 3 at one end thereof for receiving the hose.

The member 1 is provided with a contact surface 4 which extends without interruption or deflection from side wall to side wall of the member, said contacting face being disposed in an angle oblique to the longitudinal bore 5 of the member. In each side wall of the member 1 I provide groove 6 spaced from and disposed in a wedging angle to a contact face 4 thereby forming a wedge shaped tongue 7 between the groove 6 and the contact face 4.

The member 2 is provided with a contact face 8 which extends from side wall to side wall of the member 2 and is uninterrupted throughout its area, and is adapted to fit snugly and slide on the contact face 4 of the coupling member 1. Extending outwardly from the sides of the contact face 8 are lugs 9 in which are formed grooves 10, opening toward the contact face 8, the top wall of the groove 10 constituting a tongue 11, which tongues 11 are adapted and constructed to fit and slide in the grooves 6 of the member 1. Groove 10 in the member 2 is wedge shaped.

The fact that the contact faces, the grooves, and the tongues of my improved coupling extend progressively and without interruption from side wall to side wall of the coupling member permits of a progressive constant wedging action and interlock between the two members so that the seal between the two members is increased in proportion to internal pressure, lateral or lengthwise strain, in a coupling. Another result of this continuous progression of the contacting surfaces and wedging elements from side wall to side wall, is that they compensate for all wear between the parts, and at the same time keep the joint between the two coupling members tight.

The progressive continuous contacting surface extending from side wall to side wall of the coupling members gives more sealing surface, greater mechanical strength, with smaller outside diameter in proportion to the size of the bore in the members than any coupling of which I am aware. My improved construction permits of making the exterior surface of the coupling members and the combined coupling smooth and eliminates offsets projections, outside fastening devices, etc., besides which the construction of my coupling permits me to make the diameter of the coupling substantially the diameter of the hose with which it is used, which eliminates the danger of snagging while the hose and coupling are being dragged through brush, over logs, and other obstructions.

The internal clearance of the bore 5 is smooth and straight and when the two coupling members are coupled there are no offsets, pockets, projections, or angles which make it of low hydraulic resistance in relation to the size of the hose in couples.

My improved coupling is light in weight in proportion to its size, strength and capacity; having a smooth external surface, is capable of being quickly and positively coupled and uncoupled, there being no delicate or loose parts to become damaged or lost, which requirement is necessary for speed and effectiveness over rough ground, or timbered areas.

What I claim is:

1. A self-locking, gasketless hose coupling comprising male and female members, each having a longitudinal bore and a friction contact face disposed at an oblique angle to said bore, said face extending continuously in a single plane from side to side of the member, the female member being provided at diametrically opposite sides of its oblique face with counterpart lugs each formed at its inner side to provide a groove extending continuously from side to side of the member and a tongue overhanging the groove, the inner walls of the grooves and lateral faces of the tongues being straight and parallel and the inner faces of the tongues being inclined at a reverse angle to the oblique face to impart a wedge-form to the groove, and the male member being cut away at its sides to provide a projecting part to fit between the lugs of the female member and having in its sides grooves and tongues complementary in form to the tongues and grooves of the female member, whereby the members may be slidably engaged and disengaged and when engaged will be wedgingly interlocked with their friction faces in continuous sealing contact throughout and with the engaging surfaces of the lugs of the female member and projecting part of the male member closing all joints and leaving no gaps between the surfaces of said members.

2. A self-locking and gasketless hose coupling comprising two members each having a continuously plane contact face extending continuously from side to side of the member and disposed at an oblique angle to the longitudinal bore of the member, one of said members having each of its side walls provided with a groove spaced from and disposed at a wedging angle to said contact face and thereby forming a wedge-shaped tongue between said groove and said contact face, and the other member being constructed to interlock with the first-named member.

3. A self-locking and gasketless hose coupling comprising two members each having a continuously plane contact face extending continuously from side to side of the member and disposed at an oblique angle to the longitudinal bore of the member, one of said members having each of its side walls provided with a groove spaced from and disposed at a wedging angle to said contact face and thereby forming a wedge-shaped tongue between said groove and said contact face, and the other member being provided with lugs extending outwardly from the sides of its contact face, said lugs having wedge-shaped grooves formed therein and opening toward the contact face, the top wall of the groove constituting a tongue, the tongues and grooves of said members being adapted for interlocking engagement.

In testimony whereof I affix my signature.

ELTON F. ROSS.